(12) United States Patent
Toebes et al.

(10) Patent No.: US 9,438,738 B2
(45) Date of Patent: Sep. 6, 2016

(54) AUTOMATIC UPDATING OF VOICEMAIL GREETINGS BASED ON NETWORKING STATUS

(75) Inventors: Mary Ellen Toebes, Cary, NC (US); John Toebes, Cary, NC (US)

(73) Assignee: Cisco Technology, Inc., San Jose, CA (US)

(*) Notice: Subject to any disclaimer, the term of this patent is extended or adjusted under 35 U.S.C. 154(b) by 769 days.

(21) Appl. No.: 12/608,119

(22) Filed: Oct. 29, 2009

(65) Prior Publication Data

US 2011/0105087 A1 May 5, 2011

(51) Int. Cl.
*H04M 3/533* (2006.01)
*H04M 3/42* (2006.01)
*H04L 12/58* (2006.01)

(52) U.S. Cl.
CPC ...... *H04M 3/53383* (2013.01); *H04L 12/5815* (2013.01); *H04L 51/043* (2013.01); *H04M 3/42374* (2013.01)

(58) Field of Classification Search
CPC ....... H04W 4/02; H04W 64/00; H04M 3/48; H04M 3/53383; H04M 3/537; H04M 3/42374; H04M 3/53391; H04M 3/42357; H04M 3/42059; H04M 3/42365; H04M 2203/655; H04L 51/043; H04L 12/5815

USPC ........ 379/88.11, 88.12, 88.16, 88.22, 71, 76, 379/201.1, 201.01, 201.03, 88.18, 88.27, 379/88.19; 455/466, 412.1, 424.2, 413
See application file for complete search history.

(56) References Cited

U.S. PATENT DOCUMENTS

| | | | |
|---|---|---|---|
| 7,599,473 B2* | 10/2009 | Michael et al. ................. | 379/76 |
| 2005/0079873 A1* | 4/2005 | Caspi et al. ................. | 455/456.1 |
| 2006/0245556 A1* | 11/2006 | Gatzke et al. ............. | 379/88.16 |
| 2008/0261630 A1* | 10/2008 | Wormald et al. ............ | 455/466 |
| 2009/0099836 A1* | 4/2009 | Jacobsen et al. ................. | 704/3 |
| 2009/0257576 A1* | 10/2009 | Wellard et al. .......... | 379/201.03 |
| 2010/0215157 A1* | 8/2010 | Narayan et al. ............ | 379/88.19 |
| 2010/0318925 A1* | 12/2010 | Sethi ..................... | G06Q 10/10 715/760 |

* cited by examiner

*Primary Examiner* — George Eng
*Assistant Examiner* — Hung Du
(74) *Attorney, Agent, or Firm* — P. Su

(57) ABSTRACT

In one embodiment, a method includes determining when an incoming call from a caller to a callee is to be routed for processing by a voice mail arrangement, and obtaining status information associated with the callee when the incoming call is to be routed for processing by the voice mail arrangement. The method also includes generating a first greeting based on the status information, and processing the call. Processing the call includes causing the first greeting to be played for the caller.

5 Claims, 6 Drawing Sheets

AUTOMATIC UPDATING OF VOICEMAIL GREETINGS BASED ON NETWORKING STATUS

BACKGROUND

The disclosure relates generally network communications, and more particularly to enhancements for telephonic communications Most phone systems support voice mail, i.e., most phone systems allow callers to record voice mail messages and allow owners of voice mail mailboxes to listen to recorded voice mail messages. Typically, an owner of a voice mail mailbox provides a greeting that is to be played to a caller when the caller places a call to the owner, and the call is subsequently routed to the voice mail mailbox. The greeting may be recorded by the owner, or may be a "canned" greeting, e.g., a computerized greeting. Often, a greeting indicates that an owner is not able to answer his phone, and invites a caller to leave a message. An owner generally has a either a single greeting associated with his voice mail mailbox, or a few greetings that the owner chooses between depending upon his current preference.

Voice mail greetings generally do not provide information regarding the status, e.g., social networking status, of an owner of a voice mail mailbox. By way of example, a voice mail greeting which states that "John Doe is unable to answer your call right now," does not provide any status information regarding what John Doe may actually be doing.

While an owner may update his voice mail greeting to provide information regarding his status, updating voice mail greetings is generally time-consuming and inconvenient. As a result, owners typically do not update their voice mail greetings. Thus, voice mail greetings generally do not provide listeners with any indication of what an owner is currently doing.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
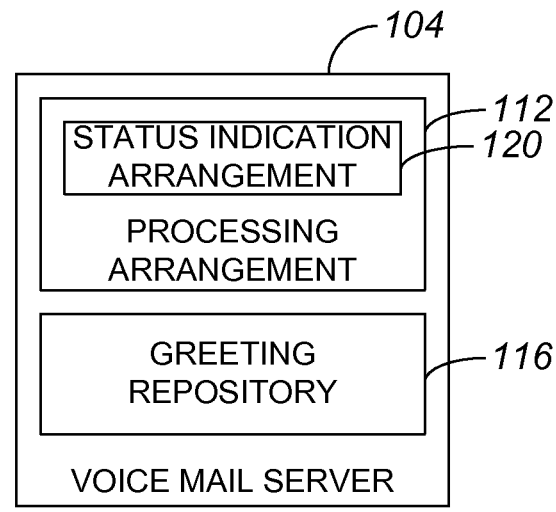
FIG. 1 is an overall system in which a voice mail greeting may be substantially automatically updated based on a current status of a party in accordance with an embodiment of the present invention.
Figure 1:

According to one aspect of the present invention, a method includes determining when an incoming call from a caller to a callee is to be routed for processing by a voice mail arrangement, and obtaining status information associated with the callee when the incoming call is to be routed for processing by the voice mail arrangement. The method also includes generating a first greeting based on the status information, and processing the call. Processing the call includes causing the first greeting to be played for the caller.

Description

When a caller attempts to place a phone call to another person, i.e., a callee, the caller may hear a voice mail greeting of the callee. When a callee does not answer a phone call, the phone call is often routed to a voice mail mailbox associated with the callee. Unless the callee has specifically recorded a voice mail greeting which describes his current status, the caller will generally be unable to determine the current status of the callee upon listening to the voice mail greeting.

Automatically updating the voice mail greeting of a callee such that a current status of the callee is indicated in the voice mail greeting provides the caller with useful information. The ability to determine the social networking presence status of the callee, for example, would allow the caller to assess whether there is a better way to contact the callee, and/or to determine a future time at which a phone call may be likely to be answered by the callee. For example, if a voice mail greeting of a callee plays as "Jane Doe is having lunch at the cafeteria from 12 pm until 1 pm," a caller may decide to go to the cafeteria to meet with Jane Doe in person, or may elect to call Jane Doe after 1 pm. Thus, information relating to the current status of a callee allows a caller to more effectively communicate with, or plan to communicate with, the callee.

As the use of "smart" devices, e.g., smart phones, increases, the ability for users to relatively frequently update their presence statuses is increasing. A smart phone may generally be a mobile phone that may be used to access the Internet, and/or may have computing capabilities. Smart phones or, more generally, smart devices may include, but are not limited to including, the internet protocol (IP) phones, the iPhone, the BlackBerry family of devices, and the Palm family of devices, e.g., the Palm Pre. Using a smart phone, a user may update his status on social networking websites, as well as on presence servers. A user may also use a smart phone to maintain a calendar of events and activities he is scheduled to participate in.

It should be appreciated that some users may elect not to share his or her social networking status with callers. In one embodiment, users have control over the decision of what information to share with callers. That is, users have a choice whether or not to share their status information. For example, a user with a smart phone may set a preference not to share status information with pre-identified callers, or with substantially all callers.

Status information of a user may be made available through a smart phone, or similar device, that is in the possession of, or is otherwise effectively owned by, the user.

In one embodiment, a voice mail greeting that plays when a call is routed to the voice mail of a user may be selected based upon the current status of the user. For example, status information of the user may be provided to a voice mail server when a call to the user is redirected to the voice mail server. The status information, e.g., a social networking presence status, may be used by the voice mail server to effectively automatically update a voice mail greeting. Updating a voice mail greeting may include, but is not limited to including, constructing a voice mail greeting that substantially reflects the current status of the user and/or otherwise identifying an appropriate status-based greeting from a selection of available, e.g., prerecorded, greetings.

Referring initially to FIG. 1, an overall system in which a voice mail greeting may be substantially updated based on a current status of a party will be described in accordance with an embodiment of the present invention. An overall system 100, which may be associated with a service provider network, includes a voice mail server 104 and a voice mail greeting playout arrangement 108.

Voice mail server includes a processing arrangement 112 and a greeting repository 116. Processing arrangement 112 may include a status indication arrangement 120, and is generally configured to process calls redirected from a callee to voice mail server 104. Status indication arrangement 120 may be arranged to identify a status of the callee, and to use the identified status to generate a suitable voice mail greeting to playout using voice mail greeting playout arrangement 108. It should be understood that status indication arrangement 120 may be configured either to effectively determine a status of the callee, e.g., when the status of the callee is not substantially automatically provided by the callee, or to obtain the status of the callee from the callee, e.g., via a short message service (SMS) message.

To generate a voice mail greeting, processing arrangement 112 may, in one embodiment, process an identified status of the callee, as for example by using a text-to-speech converter, to generate the voice mail greeting. Alternatively, the identified status of the callee may be used to facilitate a search, e.g., a keyword search, through greeting repository 116 in order to identify a stored voice mail greeting that is appropriate or substantially consistent with the status of the callee. A stored voice mail greeting may be prerecorded by the callee, or may be substantially "canned." It should be appreciated that a callee may prerecord multiple messages such that a prerecorded message is substantially available for use with a number of potential statuses. A canned voice mail greeting may be any suitable voice mail greeting which has been prerecorded. In one embodiment, a canned voice mail greeting may be a machine-generated voice mail greeting. Some canned voice mail greetings may be commercially available.

Figure 2:
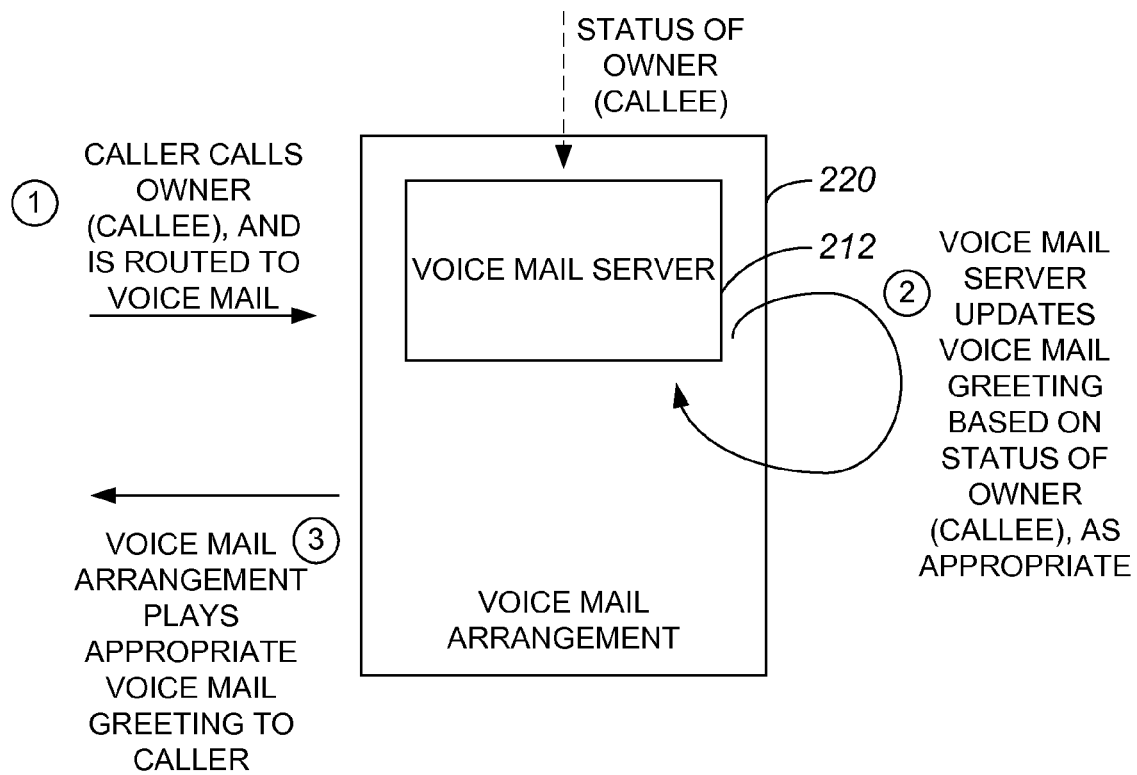
FIG. 2 is a diagrammatic representation of an overall process of playing an appropriate voice mail to a caller in accordance with an embodiment of the present invention.

FIG. 2 is a diagrammatic representation of an overall process of playing an appropriate voice mail to a caller in accordance with an embodiment of the present invention. A voice mail arrangement, or system, 220 generally includes a voice mail server 212 that is configured to automatically update voice mail greetings. When a caller initiates a call an owner of a phone number, i.e., a callee, and is effectively routed to a voice mail mailbox or account of the callee, voice mail server 212 begins to process the call. In processing the call, voice mail server 212 may obtain information relating to the status of the callee. The status of the callee is typically obtained from a device associated with the callee. That is, the status of the callee may effectively be provided to voice mail server 212 by the callee through the use of a device possessed by the callee. For example, the status may be obtained from a smart phone possessed, or otherwise owned, by the callee.

The status of the callee may generally be a social networking status of the callee, and may be arranged to effectively identify an activity in which the callee is currently participating. The status of the caller may include, but is not limited to including, an indication of what the callee is currently doing, e.g., the status may indicate that the callee is in a meeting with his or her immediate superior, and/or an indication of the current, general disposition of the callee, e.g., the status may indicate that the callee is out of the office.

Voice mail server 212, upon obtaining information relating to the status of the callee, updates a voice mail greeting associated with the callee based on the status of the callee, as appropriate. By way of example, if the status of the callee is provided as text, a text-to-speech converter may be used to effectively create a new voice mail greeting to play to the caller. Alternatively, information relating to the status of the callee may be used by voice mail server 212 to index into a data store of available voice mail greetings such that a suitable voice mail greeting for the status may be located. The available voice mail greetings may include "canned" greetings and/or greetings that have been prerecorded by the callee.

It should be appreciated that voice mail server 212 updates a voice mail greeting when appropriate and, therefore, does not always update a voice mail greeting. For instance, some callers may be identified, e.g., by a callee, as not having permissions to listen to status-based voice mail greetings. Such callers may substantially always hear a particular voice mail greeting, e.g., a voice mail greeting that is not status-based. In one embodiment, voice mail server 212 may be configured to identify an appropriate voice mail greeting to play based upon the call history of the callee. That is, the voice mail greeting played out by voice mail server 212 may be selected based at least in part upon the call history between the caller and the callee. By way of example, if the callee recently placed a call to the caller, voice mail server 212 may select a voice mail greeting which indicates that the callee recently placed a call to the caller. It should be appreciated, however, that in lieu of voice mail server 212 identifying an appropriate voice mail greeting, a smart phone or device may instead identify the appropriate voice mail greeting.

Once voice mail server 212 updates the voice mail greeting, voice mail arrangement 220 may playout the voice mail greeting to the caller. As will be appreciated by those skilled in the art, after the voice mail greeting is played, the caller is typically prompted to leave a voice mail message for the callee.

Figure 3:
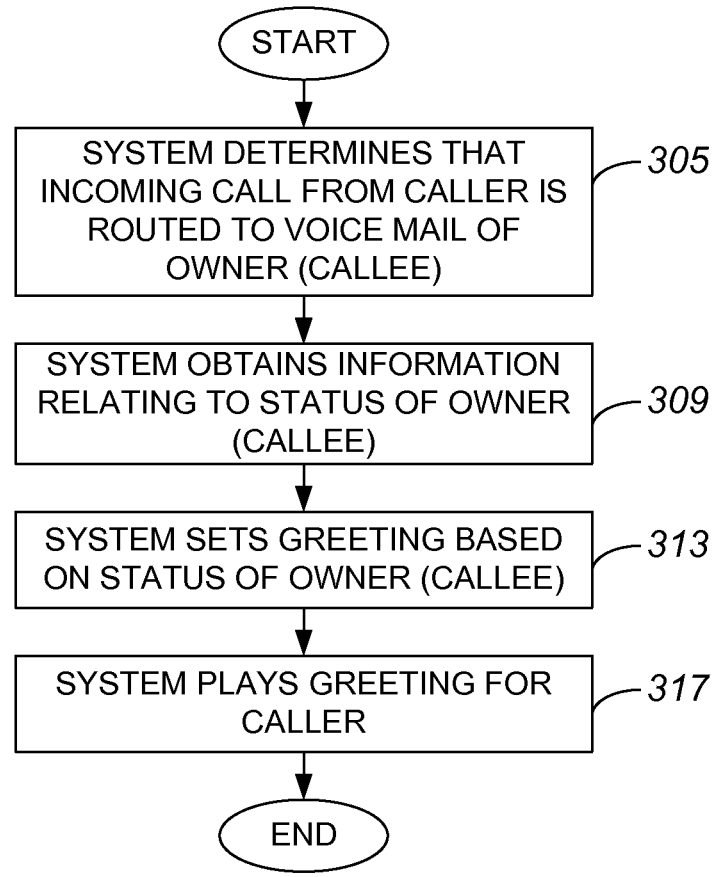
FIG. 3 is a process flow diagram which illustrates a method of automatically updating a voice mail greeting based at least in part on a status, e.g., a social networking status, in accordance with one embodiment of the present invention.

In one embodiment, a substantially single, status-based voice mail greeting may be played by a voice mail arrangement for substantially all callers. With reference to FIG. 3, a method of automatically updating a voice mail greeting based at least in part on a status, e.g., a social networking status, will be described in accordance with one embodiment of the present invention. A process 301 of automatically updating a voice mail greeting begins at step 305 in which a system determines that an incoming call from a caller is to be routed to the voice mail of an owner or callee. The system may generally include a phone and a corresponding voice mail arrangement.

Once the system determines that the incoming call is to be routed to voice mail, the system obtains information relating to the status of the callee in step 309. The information relating to the status of the callee may be obtained from, but is not limited to being obtained from, a presence server, a calendar application, a social networking website, and/or from the system. In one embodiment, a device possessed by the callee may obtain the information relating to the status of the callee, and provide that information to the system. It should be appreciated that steps 305 and 309 may occur substantially simultaneously.

After the system obtains information relating to the status of the callee, the system sets a voice mail greeting in step 313. In the described embodiment, the voice mail greeting is based on the status of the callee. The voice mail greeting may be generated by using a text-to-voice converter to convert text relating to the status of the callee into an audio representation. In lieu of generating a new voice mail greeting, the voice mail greeting may instead be obtained from a repository of pre-existing voice mail greetings. For instance, the status of the callee may be used to index into a repository which contains canned greetings and/or greetings previously recorded by the callee in an effort to create a library of potential greetings. For example, key words may be identified in the status of the callee, and the keywords may be used to index into a repository of available greetings. An appropriate canned or prerecorded greeting may be substantially automatically selected based on the status of the callee. It should be appreciated that if the status of the owner does not substantially correspond to any canned or prerecorded greeting, a default greeting may be set as the voice mail greeting. The default greeting may be, but is not limited to being, a generic voice mail greeting or the most recent voice mail greeting that was set.

The system plays the set, or selected, voice mail greeting for the caller in step 317. Once the selected voice mail greeting is played, the process of automatically updating a voice mail greeting is completed.

Figure 4:
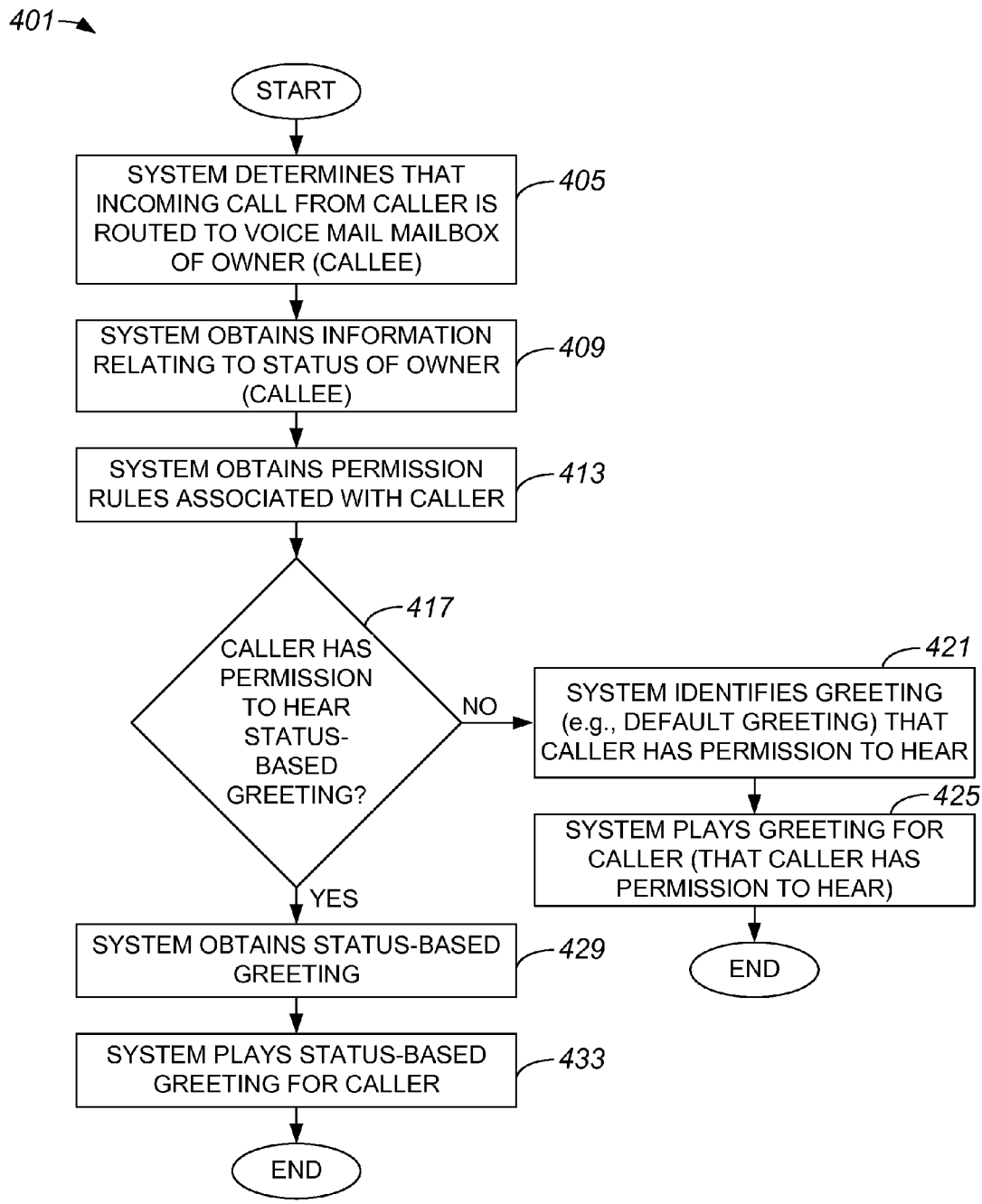
FIG. 4 is a process flow diagram which illustrates a method of automatically updating a voice mail greeting based at least in part on a status, e.g., a social networking status, in accordance with another embodiment of the present invention.

While some systems are configured to play substantially the same status-based voice mail greeting for all callers, other system may be configured to play different voice mail greetings for different callers. For example, permissions assigned to callers may be used to determine the voice mail greeting to be played for the callers. Some callers may have permissions which allow them to hear a status-based voice mail greeting, while other callers may have permissions which do not allow them to hear a status-based voice mail greeting. In other words, a voice mail greeting may be selected based in part upon the current status of a callee and based in part upon permissions assigned to callers. FIG. 4 is a process flow diagram which illustrates a method of automatically updating a voice mail greeting based at least in part on a status, e.g., a social networking status, in accordance with another embodiment of the present invention. A method 401 of automatically updating a voice mail greeting begins at step 405 in which a system determines that an incoming call from a caller to a callee is to be routed to a voice mail mailbox of the callee. After the system determines that the incoming call is to be routed to the voice mail mailbox of the callee, the system obtains information relating to the status of the callee in step 409. Such information may be obtained from any suitable source including, but not limited to including, a smart phone of the callee.

Once the system obtains information relating to the status of the callee, the system obtains permission rules associated with the caller in step 413. Permission rules may specify whether the caller is allowed to effectively be provided with status information pertaining to the callee. The system may generally either locally maintain permission rules relating to the caller, or may be configured to access permission rules maintained remotely with respect to the system. In one embodiment, permission rules may effectively be provided to the system when the incoming call is routed to the voice mail mailbox of the callee.

A determination is made in step 417 as to whether the caller has permission to hear a status-based voice mail greeting. Such a determination is generally based on the permission rules obtained by the system. In one embodiment, smart phone or device may make the determination and provide the results of the determination to the system. If the determination is that the caller has permission to hear a status-based voice mail greeting, the system obtains a status-based greeting in step 429. Obtaining, or generating, a status-based greeting may include creating a status-based greeting, or identifying a canned or prerecorded greeting using status information. Canned or prerecorded greetings, as mentioned above, may be maintained in a repository that is accessible to the system. After a status-based greeting is obtained, the system plays the status-based greeting for the caller in step 433. In one embodiment, the system may have a default greeting, e.g., a greeting that is not based on status, that is typically played for callers that is effectively overridden by the status-based greeting. The process of automatically updating a voice mail greeting is completed once the status-based greeting is played for the caller.

Returning to step 417, if the determination is that the caller does not have permission to hear a status-based greeting, then process flow moves to step 421 in which the system identifies a greeting that the caller has permission to hear. The identified greeting may be a default greeting, as for example a greeting which generally provides a notification that the callee is unable to answer a call or a greeting which instructs the caller to leave a message. Once a greeting that the caller has permission to hear is identified, that greeting is played for the caller in step 425, and the process of automatically updating a voice mail greeting is completed.

Figure 5:
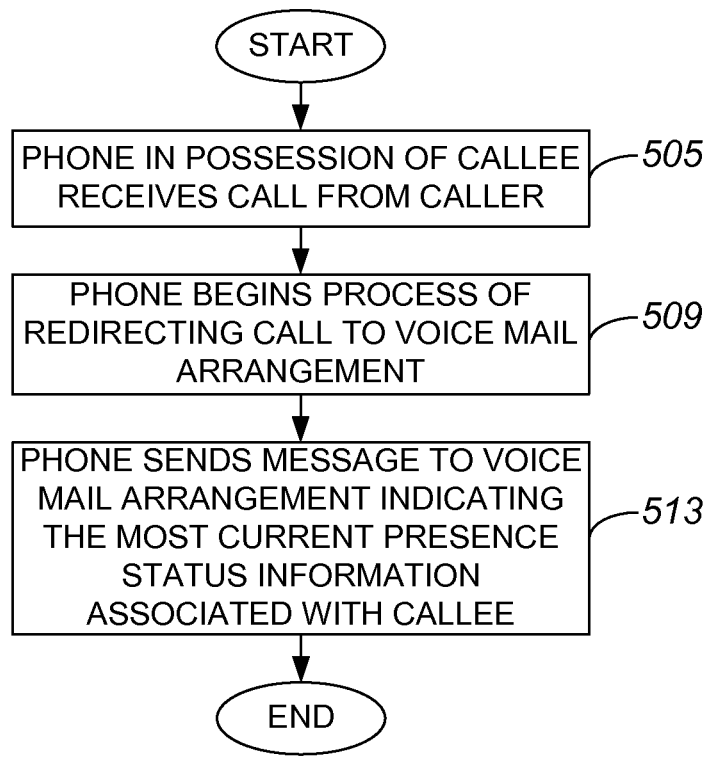
FIG. 5 is a process flow diagram which illustrates a method of providing status information to a voice mail arrangement in accordance with an embodiment of the present invention.

Devices which are in the possession of a callee may be used by the callee to provide status information to, for example, a social networking website. Status information that is provided to a social networking website may, in one embodiment, be stored locally with respect to the devices. For example, status information may be cached on the device, and a cache may be updated by a social networking website in response to a notification that a status associated with the device has been updated. Status information such as events, appointments, and the like maintained in a calendar of a callee may also be stored on or, more generally, may be accessible to, a device in the possession of the callee In one embodiment, a smart phone that is in the possession of a callee may provide status information to a voice mail arrangement when a call is received by the smart phone and routed to the voice mail arrangement. FIG. 5 is a process flow diagram which illustrates a method of providing status information, e.g., from a smart phone device, to a voice mail arrangement in accordance with an embodiment of the present invention. A process 501 of providing status information to a voice mail arrangement begins at step 505 in which a phone that is in the possession of a callee receives a call from a caller. It should be appreciated that although a phone is described, suitable devices which are suitable for receiving a call from a caller are not limited to being phones.

After the phone receives a call from the caller, the phone begins a process of redirecting the call to a voice mail arrangement in step 509. The phone may generally redirect the call to a voice mail arrangement when the callee does not answer the call, or when the phone is set to forward calls to the voice mail arrangement. Once the process of redirecting the call to the voice mail arrangement begins, the phone sends a message in step 513 to the voice mail arrangement. The message is arranged to indicate the most current presence status information associated with the callee. In other words, the message effectively indicates the most current presence status message that the voice mail arrangement is to deliver to the caller. By way of example, if the most current presence status of the callee is that the callee is in a meeting, information which indicates that the callee is in a meeting and, thus, unavailable may be provided to the voice mail arrangement. Any suitable method may generally be used to provide the most current presence status information associated with the callee to the voice mail arrangement. One method which may be used to provide the most current presence status information may include sending an SMS message to the voice mail arrangement. Upon sending a message which indicates the most current presence status information associated with the callee, the process of providing status information to a voice mail arrangement is completed.

Figure 6:
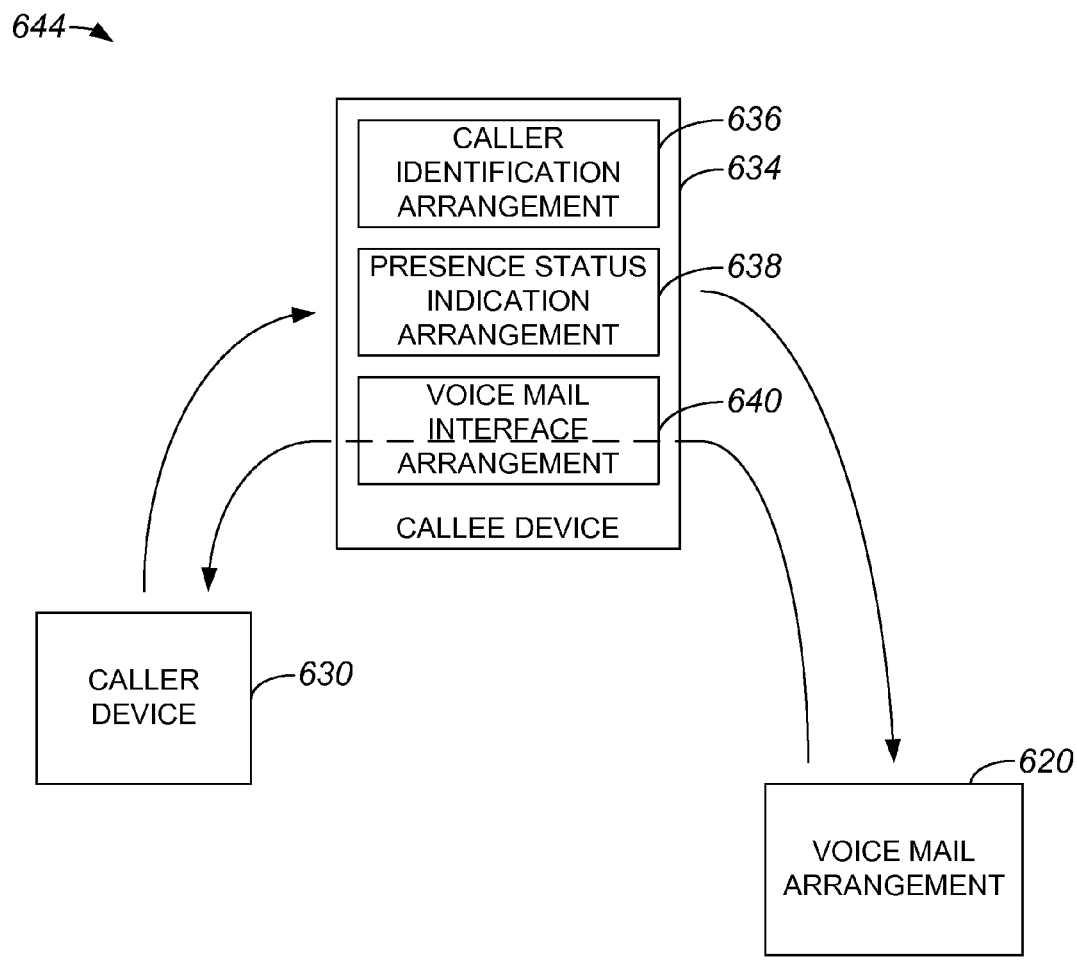
FIG. 6 is a block diagram representation of a network in which a caller hears a voice mail greeting that is based on a social networking status of a callee in accordance with an embodiment of the present invention.

FIG. 6 is a block diagram representation of a network in which a caller hears a voice mail greeting that is based on a social networking status of a callee in accordance with an embodiment of the present invention. A network 644 allows for a caller device 630, which is generally associated with a caller, to place a call to and to otherwise communicate with a callee device 634, which is generally associated with a callee. Callee device 634 is the device to which a call is placed by caller device 630 and is, hence, a called device. Communications between caller device 630 and callee device 634 may either by wired or wireless. In one embodiment, caller device 630 may be substantially any device configured to call callee device 634, and callee device 634 may be a smart phone or similar device.

Callee device 634 includes a caller identification arrangement 636, a presence status indication arrangement 638, and a voice mail interface arrangement 640. Caller identification arrangement 636 is arranged to identify when a call is received, e.g., on a communications port or interface (not shown), and, additionally, to identify caller device 630 as the source or initiator of the call. Presence status indication arrangement 638 may be arranged to allow callee device 634 to be used to indicate a status of a callee, as well as to provide the status of the callee to a voice mail arrangement 620. The status of the callee may be stored, in one embodiment, on callee device 638 by presence status indication arrangement 638. Voice mail interface arrangement 640 may be configured to facilitate routing or substantially redirecting a call from caller device 630 to voice mail arrangement 620, although a call may be provided substantially directly from caller device 630 to voice mail arrangement 620.

When a call from caller device 630 to callee device 634 is redirected to voice mail arrangement 620, callee device 634 provides status information to voice mail arrangement 620. In other words, the status of a callee is provided to voice mail arrangement 620 by the device to which a call was placed, namely callee device 634. Hence, the device that is called provides, e.g., communicates, status information to voice mail arrangement 620. Using the status information, voice mail arrangement 620 may generate a status-based voice mail greeting which may be played out to caller device 630.

In general, when multiple status messages are available, e.g., when status messages are available from multiple social networking websites, rules may be applied to determine which status to substantially deliver or otherwise use to update a voicemail greeting. A rule may essentially specify any preferences of a callee. For example, a rule may indicate that a most recently updated status be used to update a voicemail greeting, or a rule may indicate that a most recent and active status should be used to update a voicemail greeting. Attributes may be associated with rules, and one attribute may be arranged to indicate whether a status is an active status. An active status may be determined, in one embodiment, by examining the text of a status message for keywords that have an expiration associated therewith. A status message such as "at lunch" or "at dinner" may be determined to expire when the status message has not been changed for more than a predetermined amount of time. For instance, a status message of "at lunch" may be determined to be expired and, thus, may be determined not to correspond to an active status if the status message is more than approximately two hours old.

Although only a few embodiments have been described, it should be understood that the present invention may be embodied in many other specific forms without departing from the spirit or the scope of the present disclosure. By way of example, while a smart phone has generally been described as being capable of providing status information to a voice mail arrangement, substantially any suitable device may provide status information to a voice mail arrangement. Suitable devices may include, but are not limited to including, phone devices other than smart phone devices, soft phones, computing devices capable of being used to initiate and to receive calls, and/or substantially any devices configured to transmit information to a voice mail arrangement.

In general, the status information is provided to a voice mail arrangement on an as-needed basis. That is, status information is typically provided to a voice mail arrangement of a callee when a caller places a call to the callee and the call is routed to a voice mail arrangement. However, status information relating to a callee is not limited to being provided to a voice mail arrangement when a call intended for the callee is routed to the voice mail arrangement. For instance, status information may instead be provided substantially periodically, or may be provided when a change in the status of a callee is effectively detected.

While a voice mail greeting has generally been described as being played for a caller and, thus, audibly presented to a caller, playing a voice mail greeting is not limited to being audibly presented to the caller. For example, a voice mail greeting may additionally, or alternatively, be displayed to a caller. When a voice mail greeting is displayed to a caller, a display associated with a phone or a computing device used to place a call may display a textual or visual representation of the voice mail greeting.

A status-based greeting may be set, in one embodiment, as a default greeting after the status-based greeting is generated. By way of example, after a voice mail system identifies a status-based greeting based on a current presence status of an owner of a voice mail mailbox, the status-based greeting may effectively be played for every caller who places a call that is redirected to the voice mail mailbox.

Status information is typically provided by a callee, and may be provided to a variety of different locations. For instance, status information may be provided to a data store where the status information is stored, and arranged to be retrieved at a later time. Status information may also be provided by a callee to, and later obtained from, a social networking website. When a callee does not provide status information, status information may be obtained from sources in which status information relating to the callee is maintained, e.g., in a calendar in which appointments of the callee are essentially tracked, without departing from the spirit or the scope of the present disclosure.

Status information relating to a callee may be associated with entries made on substantially any social networking website, e.g., twitter.com and facebook.com, or presence server. Other social networking or similar websites may include, but are not limited to including, websites such as myspace.com and youtube.com. Status information may be obtained from a social networking website or presence server, and provided to a voice mail arrangement. On the other hand, entries made by a callee with respect to a social networking website or presence server may be maintained by the callee and provided to the voice mail arrangement. In one embodiment, entries may be annotated to facilitate the identification of keywords that may be used to substantially match status information to appropriate voice mail greetings. Alternatively, entries may be automatically filtered to identify status information and, further, keywords that may be used to substantially match status information to appropriate voice mail greetings.

In general, status information may be obtained from any source which includes, maintains, or otherwise provides presence information. By way of example, presence information may be obtained from an application such as Outlook. A calendar in Outlook, for instance, may provide information which indicates where a callee may be, and what a callee may be doing, at a particular time.

The embodiments of the present disclosure may be implemented as hardware and/or software logic embodied in a tangible medium that, when executed, is operable to perform the various methods and processes described above. That is, the logic may be embodied as physical arrangements or components. A tangible medium may be substantially any computer-readable medium that is capable of storing logic which may be executed, e.g., by a computing system, to perform methods and functions associated with the embodiments of the present invention. Such computer-readable mediums may include, but are not limited to including, physical storage devices. Executable logic may include code devices, computer program code, and/or executable computer commands or instructions.

A device such as a smart phone device may generally include hardware, e.g., speed dial buttons and a display screen, and software logic, e.g., logic that allows the telephone device to determine whether a particular phone number is associated with a speed dial button. It should be appreciated, however, that a phone device may be implemented as a software telephone and, thus, may be at least primarily associated with software logic. A telephone device may also be formed at least primarily from hardware. A voice mail arrangement, like a phone device, may be formed from hardware, software logic, or a combination of both hardware and software logic. In general, the devices and arrangements associated with the present disclosure may include hardware and/or software logic.

The steps associated with the methods described above may vary widely. Steps may be added, removed, altered, combined, and reordered without departing from the spirit of the scope of the present disclosure. By way of example, when status information is obtained by a voice mail system from an intended callee who is unavailable to answer a call, a determination may be made as to whether the status information is substantially the same as previous status information which was recently obtained from the callee. If the status information is substantially the same as previous status information, then the voice mail system may use the voice mail greeting identified using the previous status information, and substantially avoid constructing or searching for a new voice mail greeting. In other words, if status information remains essentially unchanged, then an appropriate voice mail greeting may remain substantially unchanged. Therefore, the present examples are to be considered as illustrative and not restrictive, and the disclosure is not to be limited to the details given herein, but may be modified within the scope of the appended claims.

What is claimed is:

1. An apparatus comprising:
   a communications interface, the communications interface being arranged to obtain a call placed by a first party and intended for a second party;
   a processing arrangement, the processing arrangement being arranged to process the call, the processing arrangement further being arranged to obtain a status indication associated with the second party and to obtain a call history between the first party and the second party, the processing arrangement still further being arranged to use at least one selected from a group including the status indication and the call history to generate a first greeting, the first greeting being arranged to be played out to the first party, wherein the call history between the first party and the second party indicates that the second party recently placed a call to the first party, and wherein the first greeting is arranged to indicate that the second party recently placed a call to the first party; and
   a playout arrangement, the playout arrangement being arranged to play out the first greeting to the first party.

2. The apparatus of claim 1 wherein the communications interface is further arranged to obtain the status indication and to provide the status indication to the processing arrangement.

3. The apparatus of claim 2 wherein the status indication is provided in an SMS message obtained from the second party.

4. A method comprising:
   determining when an incoming call from a caller to a callee is to be routed for processing by a voice mail arrangement;
   determining a call history between the caller and the callee, wherein the call history between the caller and the callee indicates that the callee recently placed a call to the caller;
   determining when the caller has a permission to listen to status-based greetings;
   obtaining status information associated with the callee when it is determined that the incoming call to the callee is to be routed for processing by the voice mail arrangement;
   generating a first greeting based on at least one selected from a group including the status information and the call history when it is determined that the caller has the permission to listen to the status-based greetings, the first greeting being a first status-based greeting, wherein the first greeting is arranged to indicate that the callee recently placed the call to the caller; and
   processing the call, wherein processing the call includes causing the first greeting to be played for the caller when it is determined that the caller has the permission to listen to the status-based greetings and causing a particular greeting to be played for the caller when it is determined that the caller does not have the permission to listen to the status-based greetings, wherein the particular greeting is not status-based.

5. A method comprising:
determining when an incoming call from a caller to a callee is to be routed for processing by a voice mail arrangement;
determining a call history between the caller and the callee;
determining when the caller has a permission to listen to status-based greetings;
obtaining status information associated with the callee when it is determined that the incoming call to the callee is to be routed for processing by the voice mail arrangement, wherein obtaining the status information associated with the callee includes obtaining a first status associated with the callee from a first social networking website and obtaining a second status associated with the callee from a second social networking website;
generating a first greeting based on at least one selected from a group including the status information and the call history when it is determined that the caller has the permission to listen to the status-based greetings, the first greeting being a first status-based greeting, wherein generating the first greeting based on the at least one selected from the group including the status information and the call history includes using at least one rule to determine whether to generate the first greeting based on the first status or to generate the first greeting based on the second status; and
processing the call, wherein processing the call includes causing the first greeting to be played for the caller when it is determined that the caller has the permission to listen to the status-based greetings and causing a particular greeting to be played for the caller when it is determined that the caller does not have the permission to listen to the status-based greetings, wherein the particular greeting is not status-based.

* * * * *